(No Model.) 3 Sheets—Sheet 2.
C. H. LAND.
Baby Jumper.
No. 230,707. Patented Aug. 3, 1880.
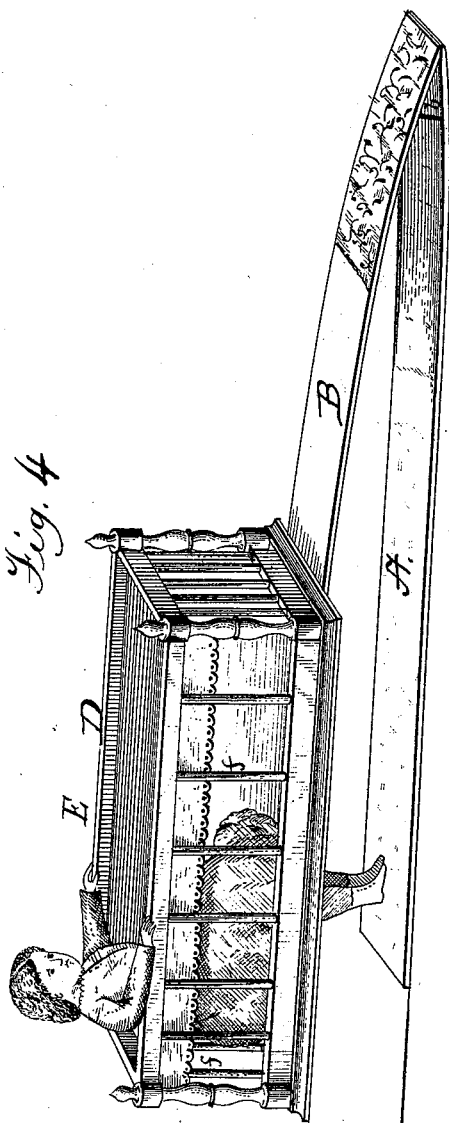
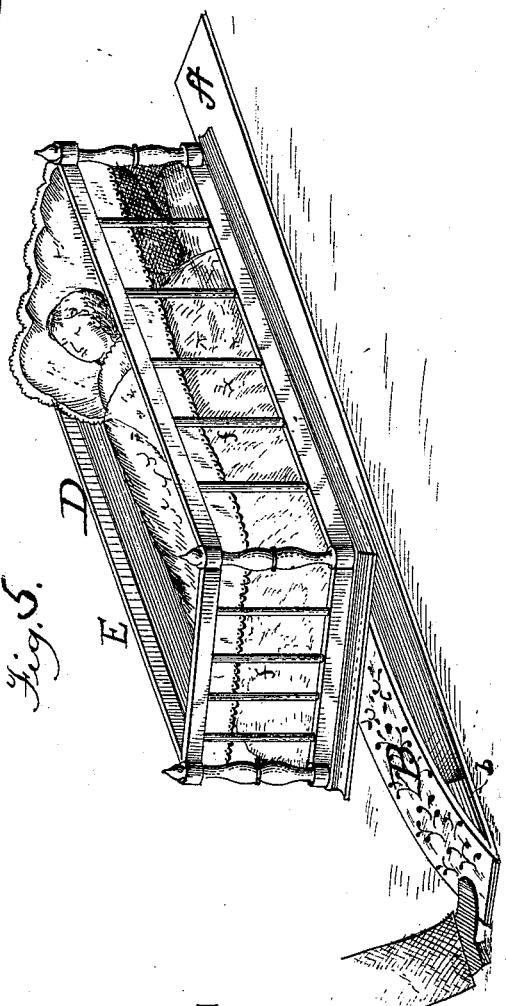
Witnesses:
J. Walter Fowler.
Jas. H. Clark.
Inventor:
C. H. Land
by Heyhmun & Kane.
Attorneys.

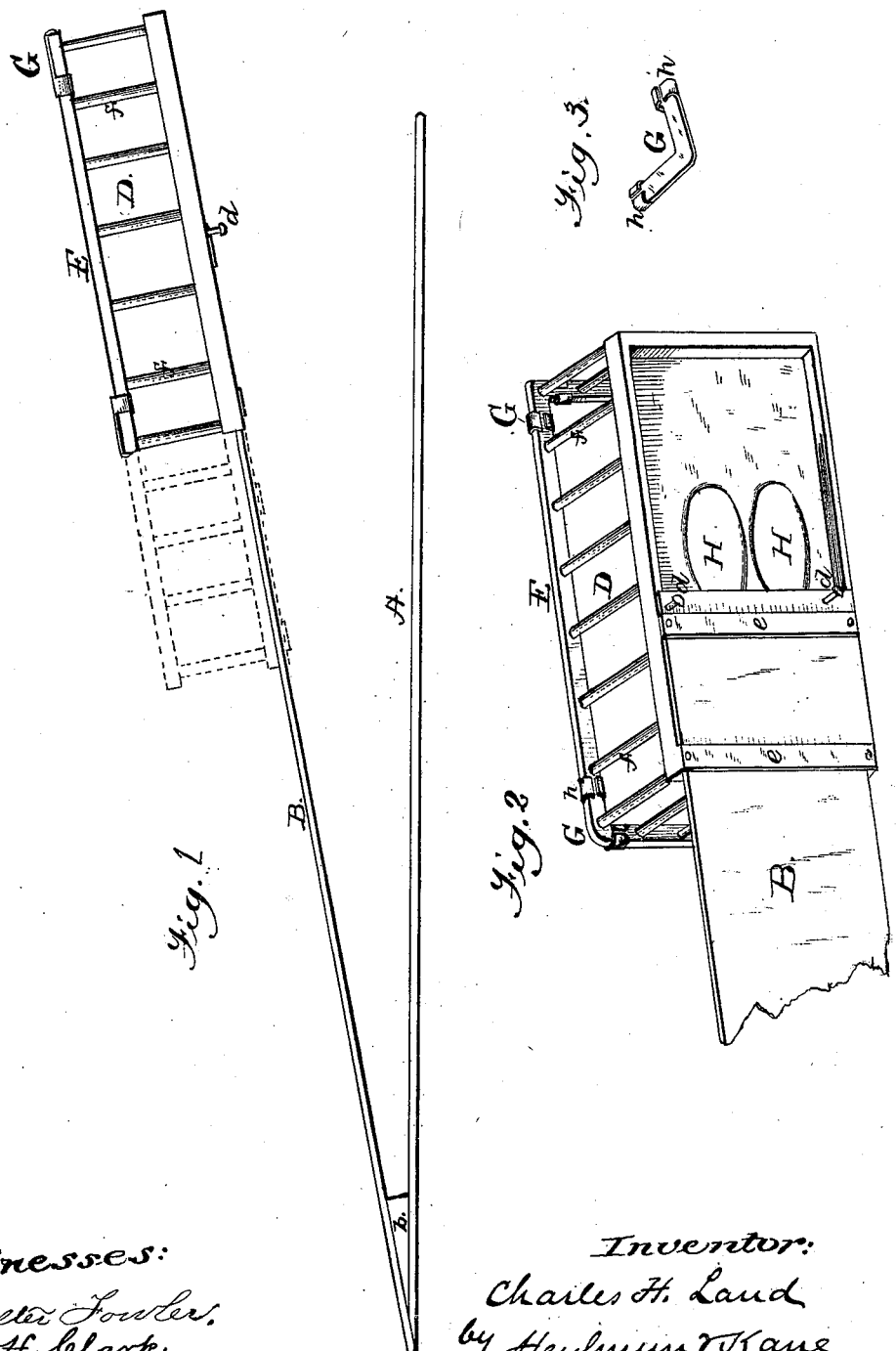

(No Model.) 3 Sheets—Sheet 3.

C. H. LAND.
Baby Jumper.

No. 230,707. Patented Aug. 3, 1880.

Witnesses:
J. Walter Fowler.
Jas. H. Clark.

Inventor:
Charles H. Land
by Heylmun & Kane
Attorneys.

UNITED STATES PATENT OFFICE.

CHARLES H. LAND, OF DETROIT, MICHIGAN.

BABY-JUMPER.

SPECIFICATION forming part of Letters Patent No. 230,707, dated August 3, 1880.

Application filed April 26, 1880. (No model.)

*To all whom it may concern:*

Be it known that I, CHARLES H. LAND, a citizen of the United States, residing at Detroit, in the county of Wayne and State of Michigan, have invented certain new and useful Improvements in Baby-Jumpers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 6:
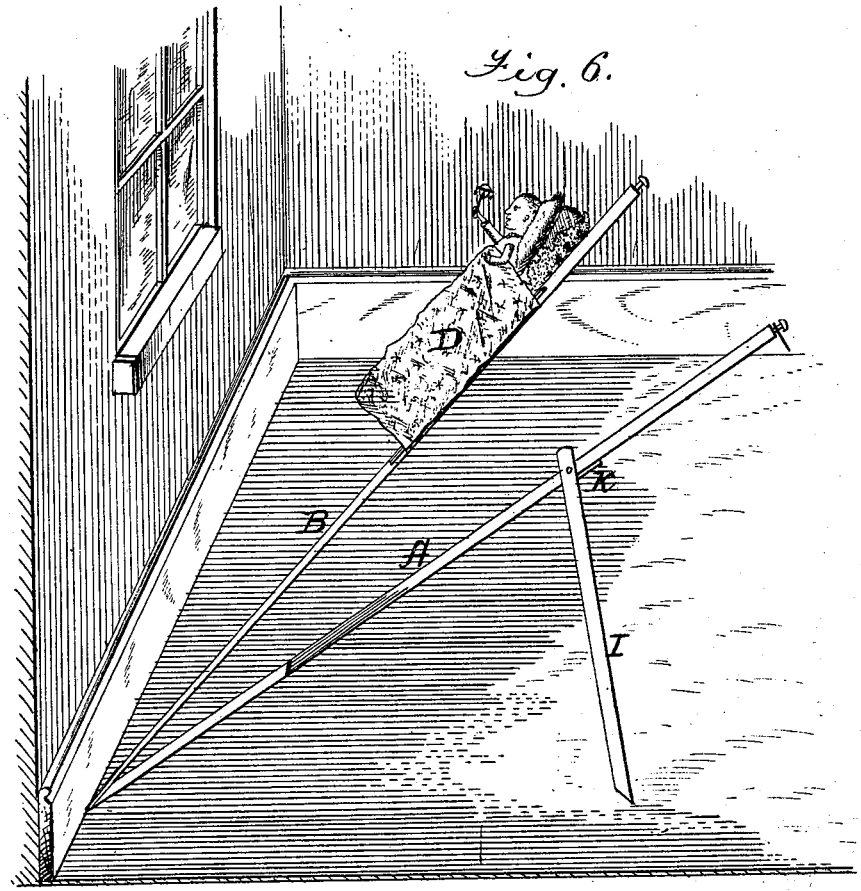
Figure 7:
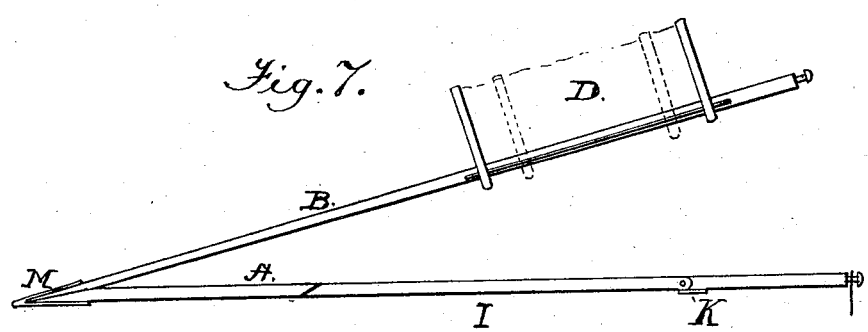

Figure 1 of the drawings is a side view, showing the crib in full and dotted lines. Fig. 2 is a perspective view of the crib. Fig. 3 is a perspective view of the railing-clamp. Fig. 4 is a perspective view of the jumper, showing the child teetering. Fig. 5 is another perspective view, showing the child at rest. Fig. 6 is a side view, showing the jumper in an elevated position. Fig. 7 is a side view, showing some modifications.

This invention relates to the class of baby-jumpers for amusing children and affording means for the child to rest or sleep in, and is designed as an improvement upon those now in general use in the following particulars: great durability, simplicity, cheapness, noiselessness, freedom from friction, and dispensing with the use of metal springs and oiling.

My improvements therefore consist in a spring-board baby-jumper composed, essentially, of two parts, to wit: a base-board and a spring-board suitably connected at one end with a wedge-shaped block.

It also consists in the combination of the base-board, spring-board, and a crib, or its equivalent, capable of a sliding motion upon the spring-board, to permit the child to thrust its legs through two holes in the bottom of the crib provided for the purpose, whereby the child can teeter.

It also consists, in combination with the base-board, spring-board, and crib, or its equivalent, of pivoted supports for sustaining the jumper in an inclined position, so that the child can look out of the window of the house, when placed within a room, and see objects without, as will be hereinafter more fully set forth.

In the annexed drawings, forming a part of this specification, the letter A represents the base-board, which is made of wood and of a suitable length and width, and the letter B represents the spring-board, made of the same material and of the same width, but not so long as the base-board.

The spring-board is united to the base-board, to gain an acute angle, by beveling the parts together, and by introducing at the rear of contact a wedge-shaped block, $b$, affording a better support, substantially as shown in Fig. 1 of the drawings.

To the end of the spring-board is arranged the crib D, capable of a sliding motion, its limit being controlled or regulated by the stops or projections $d$ on the under side of the spring-board. The bottom board of this crib is recessed of a depth to correspond with the thickness of the spring-board, and is also provided with two transverse bars, $e\ e$, having suitable set means (not shown) for retaining and securing the crib upon the spring-board in the desired position.

The sliding crib is constructed as shown in the drawings, Figs. 1 and 2, with a number of vertical bars, $f$, attached to the bottom board and upper railing, E, which forms a shield or guard to prevent the child from falling out. The corner connections of the upper rail, E, are firmly secured by means of the metallic clamp G, as fully shown in perspective in Fig. 3.

The ends $h$ of the clamp G are passed down the sides of the railing and bent under, so as to lie flat upon the under surface of the railing.

The bottom board of the crib or basket D is formed with two oblong openings, H, to permit the child, when of proper age or size, to pass its legs or lower limbs through them to teeter or jump itself from the base-board.

When the child becomes tired of jumping or teetering the legs are withdrawn from the openings and the sliding crib drawn back to its normal position, closing the openings, when the child can lie back on a pillow arranged within the crib or basket, substantially as shown in Fig. 5 of the drawings.

When the child is very young, not able to teeter himself, the spring-board will be operated by the foot of the attendant.

In operation, the weight of the child in the crib will cause the forward end of the jumper to slightly rise, as seen in Fig. 4, from the floor to the distance of about one inch, and by depressing this portion of the jumper with the foot, as seen in Fig. 5, which is merely the raising of the forward portion of the foot, it causes an undulatory movement at the rear end of about six inches, thereby producing upon the infant or child a most agreeable and soothing effect.

It will be observed that the base and spring boards in my jumper are made of flat pieces of wood, and that the spring-board, being arranged at an acute angle, affords an incline plane for the child to ascend, and also a means for the child to enter the crib.

By this arrangement of the spring-board and basket or crib with the base-board I am enabled to bring the upper end of the spring-board within one foot or more from the floor, so that there is no danger of the child being injured.

The base-board, near its rear end, is provided with two pivoted supports or props, I, arranged on opposite sides, (see Fig. 6,) to sustain the jumper with child in an upright or inclined position for further amusement. These supports are retained in position from backward displacement by means of a cross-bar, K, attached to the under surface of the base-board in such a manner as to be switched in the direction of the length of the board.

By means of these supports I am enabled to further amuse the child by adjusting and supporting the jumper on its front end, so that it can be raised up to a window to see objects without.

In Figs. 6 and 7 of the drawings I have shown a modification in the construction of the crib, also in connecting the forward ends of the base-board and spring-board by means of a metallic angular piece, M.

The rear ends of the base and spring boards are provided with a catch and hook for compressing the parts at this end within a small compass, so that the jumper can be stowed away in the corner of a closet or under the bed or hung upon the wall.

It will be readily seen that a baby-jumper of this construction is very simple and noiseless, also free from friction, and needs no oiling.

What I claim as my invention, and desire to secure by Letters Patent, is—

1. A spring-board baby-jumper consisting of a base-board and a spring-board united directly together at their front ends at an acute angle, and supported by a wedge-shaped block, substantially as described.

2. The combination, substantially as described, of a base-board, a spring-board, and a sliding crib having two openings for the passage of the child's lower limbs, the crib being adapted to slide forward upon the spring-board to close the openings and form a crib for the child to lie in.

3. The combination, with a base-board, a spring-board, and a crib, of pivoted supports or props for sustaining the jumper in an upright or inclined position, substantially as described.

4. The combination, with a base-board, a spring-board, and a crib, of pivoted supports or props and a cross-bar attached in rear of the pivoted supports, substantially as and for the purpose set forth.

In testimony whereof I affix my signature in presence of two witnesses.

CHARLES H. LAND.

Witnesses:
WM. W. WITHERSPOON,
JNO. B. CORLISS.